US011924197B1

(12) United States Patent
Sanchez

(10) Patent No.: US 11,924,197 B1
(45) Date of Patent: *Mar. 5, 2024

(54) USER AUTHENTICATION SYSTEMS AND METHODS

(71) Applicant: GROWPATH, LLC, Durham, NC (US)

(72) Inventor: Eric Jason Sanchez, Cary, NC (US)

(73) Assignee: GrowPath, LLC, Durham, NC (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/576,229

(22) Filed: Jan. 14, 2022

Related U.S. Application Data

(63) Continuation of application No. 16/121,504, filed on Sep. 4, 2018, now Pat. No. 11,265,311, which is a
(Continued)

(51) Int. Cl.
*H04L 29/06* (2006.01)
*G06F 21/44* (2013.01)
(Continued)

(52) U.S. Cl.
CPC ............ *H04L 63/083* (2013.01); *G06F 21/44* (2013.01); *G06F 21/45* (2013.01); *G06Q 50/01* (2013.01);
(Continued)

(58) Field of Classification Search
CPC ............... H04L 63/083; H04L 63/0272; H04L 2463/082; G06F 21/44; G06F 21/45; G06Q 50/01
(Continued)

(56) References Cited

U.S. PATENT DOCUMENTS 5,040,223 A * 8/1991 Kamiya ................. G07C 9/257
382/227
5,898,422 A * 4/1999 Zetts .................... G06F 3/04812
715/839
(Continued)

FOREIGN PATENT DOCUMENTS

CN         1596823 A  *  3/2005
CN       100591089 C      2/2010
(Continued)

OTHER PUBLICATIONS

Forums Unity Community Discussion Scripting, https: //forum.unity.com/threads/load-jpeg-without-converting-to-texture.121432/, Jan. 30, 2012 (Year: 2012).*
(Continued)

*Primary Examiner* — Luu T Pham
*Assistant Examiner* — Walter J Malinowski
(74) *Attorney, Agent, or Firm* — Wells St. John P.S.

(57) ABSTRACT

A method of authenticating a user of a multifunction device to a server, the method comprising associating a user-supplied image with user login credentials, using a server; receiving, at the server, an image uploaded from the multifunction device; and comparing the uploaded image to the user-supplied image, using the server, and, only if the uploaded image matches the user-supplied image, allowing the user of the multifunction device to authenticate to the server by providing additional login credentials to the server using the multifunction device.

25 Claims, 4 Drawing Sheets

Related U.S. Application Data continuation of application No. 15/675,703, filed on Aug. 12, 2017, now Pat. No. 10,097,538.

(51) Int. Cl.
*H04L 9/40* (2022.01)
*G06F 21/45* (2013.01)
*G06Q 50/00* (2012.01)

(52) U.S. Cl.
CPC .... *H04L 63/0272* (2013.01); *H04L 2463/082* (2013.01)

(58) Field of Classification Search
USPC .................................................. 726/7
See application file for complete search history.

(56) References Cited

U.S. PATENT DOCUMENTS

| | | | |
|---|---|---|---|
| 6,501,852 B1 | 12/2002 | Clark | |
| 6,604,157 B1* | 8/2003 | Brusky | H04N 1/00241 |
| | | | 719/329 |
| 6,851,051 B1* | 2/2005 | Bolle | G06V 40/40 |
| | | | 713/168 |
| 7,340,530 B2* | 3/2008 | Godwin | H04L 63/102 |
| | | | 709/245 |
| 8,280,197 B1* | 10/2012 | Foote | G06F 3/14 |
| | | | 382/305 |
| 8,752,145 B1 | 6/2014 | Dotan et al. | |
| 9,602,508 B1 | 3/2017 | Mahaffey et al. | |
| 9,697,548 B1* | 7/2017 | Jaff | G06Q 30/0601 |
| 10,623,374 B2* | 4/2020 | Israel | H04L 43/045 |
| 2002/0023032 A1* | 2/2002 | Pearson | G06Q 40/00 |
| | | | 705/35 |
| 2003/0220835 A1 | 11/2003 | Barnes, Jr. | |
| 2004/0093527 A1 | 5/2004 | Pering et al. | |
| 2005/0018919 A1 | 1/2005 | Shiraishi et al. | |
| 2006/0095388 A1* | 5/2006 | Brown | H04L 9/3263 |
| | | | 705/67 |
| 2006/0149846 A1 | 7/2006 | Schuba | |
| 2006/0167834 A1* | 7/2006 | Rubel | G06F 16/3329 |
| 2007/0049302 A1* | 3/2007 | Mickeleit | G06Q 10/10 |
| | | | 455/466 |
| 2008/0022377 A1 | 1/2008 | Chen et al. | |
| 2008/0034213 A1 | 2/2008 | Boemker et al. | |
| 2008/0144974 A1* | 6/2008 | Bhakta | G06F 16/51 |
| | | | 382/298 |
| 2008/0279452 A1* | 11/2008 | Keane | G06F 16/29 |
| | | | 382/173 |
| 2009/0113527 A1 | 4/2009 | Naaman et al. | |
| 2009/0122145 A1 | 5/2009 | Ono | |
| 2009/0133051 A1 | 5/2009 | Hildreth | |
| 2009/0138805 A1 | 5/2009 | Hildreth | |
| 2009/0158392 A1 | 6/2009 | Hughes et al. | |
| 2009/0158399 A1 | 6/2009 | Cooley et al. | |
| 2009/0216631 A1 | 8/2009 | Ahn | |
| 2009/0304267 A1* | 12/2009 | Tapley | G06F 16/5854 |
| | | | 382/156 |
| 2010/0043062 A1 | 2/2010 | Alexander et al. | |
| 2010/0186074 A1 | 7/2010 | Stavrou et al. | |
| 2011/0231910 A1 | 9/2011 | Mohanty et al. | |
| 2011/0289224 A1 | 11/2011 | Trott | |
| 2011/0292219 A1* | 12/2011 | Chang | G06T 7/80 |
| | | | 348/181 |
| 2011/0292946 A1* | 12/2011 | Flinta | H04L 12/4633 |
| | | | 370/395.53 |
| 2012/0008769 A1 | 1/2012 | Collins et al. | |
| 2012/0078725 A1* | 3/2012 | Maitra | G06Q 30/0269 |
| | | | 705/14.66 |
| 2012/0134589 A1 | 5/2012 | Reddy | |
| 2012/0278155 A1 | 11/2012 | Faith | |
| 2013/0067235 A1 | 3/2013 | Anson | |
| 2013/0145420 A1 | 6/2013 | Ting et al. | |
| 2013/0151849 A1* | 6/2013 | Graham | G06F 21/00 |
| | | | 713/164 |
| 2013/0153662 A1 | 6/2013 | Narasa Prakash | |
| 2013/0182279 A1 | 7/2013 | Yano | |
| 2013/0257888 A1 | 10/2013 | Behrens et al. | |
| 2013/0291078 A1 | 10/2013 | McFarland et al. | |
| 2013/0301830 A1 | 11/2013 | Bar-El et al. | |
| 2013/0318581 A1 | 11/2013 | Counterman | |
| 2014/0125593 A1 | 5/2014 | Li | |
| 2014/0143137 A1 | 5/2014 | Carlson | |
| 2014/0156545 A1 | 6/2014 | Clapham et al. | |
| 2014/0244451 A1 | 8/2014 | Mayer | |
| 2014/0253326 A1 | 9/2014 | Cho et al. | |
| 2014/0270408 A1* | 9/2014 | Hutchison, IV | G06F 16/5838 |
| | | | 382/118 |
| 2014/0298256 A1 | 10/2014 | Schulz et al. | |
| 2014/0380060 A1 | 12/2014 | Ganguly | |
| 2015/0213304 A1 | 7/2015 | Passe | |
| 2015/0269369 A1 | 9/2015 | Hamid | |
| 2015/0269466 A1* | 9/2015 | Inotay | H04L 63/0823 |
| | | | 235/494 |
| 2015/0271164 A1 | 9/2015 | Hamid | |
| 2015/0373011 A1 | 12/2015 | Subramanya et al. | |
| 2016/0028726 A1 | 1/2016 | Matthews et al. | |
| 2016/0050198 A1 | 2/2016 | Thibadeau Sr. et al. | |
| 2016/0080343 A1 | 3/2016 | Robinton | |
| 2016/0082926 A1 | 3/2016 | Mouser et al. | |
| 2016/0085994 A1 | 3/2016 | Pereira | |
| 2016/0110348 A1 | 4/2016 | Issaev | |
| 2016/0171209 A1 | 6/2016 | Perez et al. | |
| 2016/0173929 A1 | 6/2016 | Klappert et al. | |
| 2016/0292406 A1* | 10/2016 | Gandhi | G06F 21/32 |
| 2017/0017964 A1 | 1/2017 | Janefalkar et al. | |
| 2017/0019784 A1 | 1/2017 | Janefalkar | |
| 2017/0048257 A1 | 2/2017 | Hamid | |
| 2017/0054702 A1 | 2/2017 | Turgeman | |
| 2017/0104885 A1 | 4/2017 | Amtrup et al. | |
| 2017/0142090 A1 | 5/2017 | Mahaffey et al. | |
| 2017/0142109 A1 | 5/2017 | Mandal et al. | |
| 2017/0147545 A1 | 5/2017 | Amoli et al. | |
| 2017/0177798 A1 | 6/2017 | Samuel et al. | |
| 2017/0264600 A1 | 9/2017 | Froelicher et al. | |
| 2017/0308902 A1 | 10/2017 | Quiroga et al. | |
| 2017/0316408 A1 | 11/2017 | Bernesby | |
| 2017/0330233 A1 | 11/2017 | Bruno et al. | |
| 2017/0357979 A1 | 12/2017 | Khurana et al. | |
| 2017/0374046 A1* | 12/2017 | Narasimhan | G06Q 20/3829 |
| 2018/0189505 A1* | 7/2018 | Ghafourifar | G06F 21/6209 |
| 2018/0227128 A1 | 8/2018 | Church et al. | |
| 2019/0163980 A1* | 5/2019 | Johnson | G06V 20/95 |

FOREIGN PATENT DOCUMENTS

| | | | | |
|---|---|---|---|---|
| CN | 102693233 A | | 9/2012 | |
| JP | 2001134530 A | * | 5/2001 | |
| KR | 20130000811 A | * | 1/2013 | |
| KR | 20130520 | | 5/2013 | |
| WO | WO-2015076657 A1 | * | 5/2015 | H04L 63/08 |

OTHER PUBLICATIONS

Dinh, Hoang T., Chonho Lee, Dusit Niyato, and Ping Wang. "A survey of mobile cloud computing: architecture, applications, and approaches." Wireless communications and mobile computing 13, No. 18 (2013): 1587-1611. (Year: 2013).*

Lardinois, Passage Replaces Your Password With Images, Disrupt Europe Hackathon 2014: London, Oct. 19, 2014, TechCrunch.com.

InAuth and AimBrain Collaborate to Bring Six-Factor Mobile Authentication Solution to Financial Services Providers, Aug. 1, 2017, Business Wire.

Converting a byte array into an image using PHP and HTML, discussion, Sep. 21, 2012, stackoverflow.com.

Cimpanu, Researchers Devise 2FA System That Relies on Taking Photos of Ordinary Objects, bleepingcomputer.com, Oct. 28, 2017, https://www.bleepingcomputer.com/news/security/researchers-devise-2fa-system-that-relies-on-taking-photos-of-ordinary-objects/.

Azimpourkivi, Topkara, and Carbunar, Camera Based Two Factor Authentication Through Mobile and Wearable Devices, Proceedings

(56) References Cited

OTHER PUBLICATIONS of the ACM on Interactive, Mobile, Wearable and Ubiquitous Technologies, vol. 1, No. 3, Sep. 2017.

Cole, Dudek, Nesfield, Aitken, Wessnitzer, Passage Pictures as passwords on every platform, Disrupt EU Hackathon 2014:London, web printed Aug. 31, 2018, devpost.com.

DaCosta, Italo, Saurabh Chakradeo, Mustague Ahamad, and Patrick Traynor. "One-time cookies: Preventing session hijacking attacks with stateless authentication tokens." ACM Transactions on Internet Technology (TOIT) 12, No. 1 (2012): 1. (Year: 2012).

Pavlovski, Christopher, Claudia Warwar, Brett Paskin, and Gary Chan. "Unified framework for multifactor authentication." In Telecommunications (ICT), 2015 22nd International Conference on, pp. 209-213. IEEE, 2015. (Year: 2015).

Bhargavan, Karthikeyan, Cedric Fournet, Andrew D. Gordon, and Nikhil Swamy. "Verified implementations of the information card federated identity-management protocol." In Proceedings of the 2008 ACM symposium on Information, computer and communications security, pp. 123-135. 2008. (Year: 2008).

Wang, Guanhua. "Application of serialization enhanced SSO system." In 2011 IEEE International Conference on Computer Science and Automation Engineering, vol. 1, pp. 490-494. IEEE, 2011. (Year: 2011).

Mao, Ziqing, Dinei Florencio, and Cormac Herley. "Painless migration from passwords to two factor authentication." ;2011 IEEE International Workshop on Information Forensics and Security, pp. 1-6. IEEE, 2011. (Year: 2011).

Migdal, Denis, Christian Johansen, and Audun Josang. "OffPAD-Offline Personal Authenticating Device with Applications in Hospitals and e-Banking."; Proceedings of the 2016 ACM SIGSAC Conference on Computer and Communications Security, pp. 1847-1849. ACM, 2016. (Year: 2016).

Srinivas, Sampath, Dirk Balfanz, Eric Tiffany, Alexi Czeskis, and F. Alliance. Universal 2nd factor (U2F) overview. FIDO Alliance Proposed Standard (2015): 1-5. (Year: 2015).

Mohan, "An image authentication approach using phase encoded image matching and digital holography", IEEE, 2015, 4 pages.

Mohsin, "Two Factor Vs. Multi-Factor, an Authentication Battle in Middle Cloud Computing Environments", ICFNDS'17, Jul. 19-20, 2017, ACM, 10 pages.

Goode Intelligence, "Putting the Mobile Network Operator at the Heat of Authentication Services with Nok Nok Labs' FIDO Ready products", Oct. 14, 15 pages.

* cited by examiner

USER AUTHENTICATION SYSTEMS AND METHODS

CROSS-REFERENCE TO RELATED APPLICATION

This is a continuation of U.S. patent application Ser. No. 16/121,504 to Sanchez, filed Sep. 4, 2018, which in turn is a continuation of U.S. patent application Ser. No. 15/675,703 to Sanchez, filed Aug. 12, 2017 (now U.S. Pat. No. 10,097,538), both of which are incorporated herein by reference.

TECHNICAL FIELD

The technical field comprises user authentication in a distributed network. The technical field also comprises systems and methods for authorizing a client device to remotely log in to a server via a network, such as the Internet.

BACKGROUND

Many computer servers, such as those hosting or serving websites, require user authentication before a user's client device is given access to information on the server. A typical user login procedure requires a user to provide a user name and a password.

For additional security, some systems require two factor (also known as second factor) authentication. For example, the system requires a code from a user, such as one that is generated by a separate one time password hardware device, that is received via text message on a user's phone, or that is generated by an authentication app on a mobile device.

Some servers, such as financial institution servers, require a user to pick an image from a number of images available on the server. These images are sometimes called site keys. That way, the user can be assured of connecting to a legitimate server or website instead of entering credentials on an imposter web page. This reduces the risk of loss due to theft by criminals who steal login credentials of users through imposter web pages and then log in to the legitimate server using the stolen login credentials. For example, sometimes the users are directed to imposter pages with phishing scams. The user may receive a fake email that appears to come from the user's financial institution or some other legitimate source that contains a link to an imposter web page and that instructs them to act.

However, such security images do not always provide the intended security benefits. A hacker can use a man-in-the-middle attack that removes the SSL (Secure Sockets Layer). SSL is the standard security technology for establishing an encrypted link between a web server and a browser. The SSL is what ensures that data passed between the web server and browsers remain private. The only visible indication of the attack is the lack of an "s" in the browser's address bar. In other words, "http" appears instead of "https." HTTPS indicates Hyper Text Transfer Protocol Secure as opposed to regular Hyper Text Transfer Protocol. This is a minor difference that may easily go unnoticed.

Alternatively, the imposter web page may not show any security image at all, and simply try to persuade the user that there is some legitimate reason why there is no security image, such as because the image displaying system is down for maintenance. Thus, such website security images selected from a plurality of website-provided images can be ineffective.

SUMMARY

Some embodiments provide a method of authenticating a user of a multifunction device to a server, the method including: associating a user-supplied image with user login credentials, using a server; receiving, at the server, an image uploaded from the multifunction device; and comparing the uploaded image to the user-supplied image, using the server, and, only if the uploaded image is exactly identical to the user-supplied image, allowing the user of the multifunction device to authenticate to the server by providing additional login credentials to the server using the multifunction device.

Other embodiments provide a method including receiving, at a server, from a trusted client device, a request to authenticate a user's mobile device bearing a mobile app, the user having login credentials; the server requesting, from the trusted client device, a unique user-supplied image, and an IMEI, and a phone number for a mobile device; the server receiving the unique user-supplied image, the IMEI, and the phone number of the mobile device; the server storing, in a memory, the unique user-supplied image, the IMEI, and the phone number of the mobile device; the server associating, in the memory, the unique user-supplied image, the IMEI, and the phone number, with the unique user-supplied image; the server generating an activation PIN; the server requesting an image from the user's mobile device; and in response to the receiving an image from the user's mobile device matching the unique user-supplied image, as well as receiving the user's login credentials from the user's mobile device matching the user's login credentials, authenticating the user's mobile device.

Still other embodiments provide a server including: a first receiver configured to receive, from a trusted client device, a unique user supplied image and login credentials for a mobile device different from the trusted client device; a memory configured to store the unique user-supplied image and login credentials; a second receiver configured to receive, from a user's mobile device, an uploaded image and login credentials; a comparator configured to compare the uploaded image and login credentials to the unique user-supplied image and login credentials stored in the memory; and an authenticator configured to authenticate the mobile device in response to the comparator determining that the uploaded image exactly matches the unique user-supplied image stored in memory.

Other embodiments provide a method comprising receiving, at a server, from a trusted client computer device, a request to authenticate a mobile device of a user, the mobile device bearing a mobile app, the user having login credentials stored at the server, the trusted client computer device being different from the mobile device; storing, at the server, a list of Internet Protocol (IP) addresses of authorized client devices, wherein the trusted client computer device has an IP address included in the list; requesting, by the server, from the trusted client computer device, a user-supplied memorable image file to be selected from a plurality of image files available to the user of the trusted client computer device including image files created by the user and image files not created by the user; receiving, by the server, the user-supplied memorable image file; storing, by the server, in a memory, the user-supplied memorable image file; converting, by the server, the user-supplied memorable image file to a first byte array by renaming a file containing the user-supplied memorable image file to a .txt file; associating, by the server, in the memory, the user-supplied memorable image file with the login credentials of the user; generating, by the server, a one time activation Personal Identification Number (PIN); requesting, by the server, a mobile-supplied image file and login credentials from the mobile device of the user; receiving, by the server, the mobile-supplied image file from the mobile device of the user and converting the mobile-supplied image file to a second byte array; activating the mobile app in response to the user entering the PIN in the mobile app; and authenticating, by the server, the mobile device of the user in response to the second byte array matching the first byte array and in response to the login credentials of the user from the mobile device of the user matching the stored login credentials of the user, without requiring the PIN after the mobile app has been activated.

Other embodiments provide a server configured to receive, from a trusted client computer device, a request to authenticate a mobile device of a user, the mobile device bearing a mobile app, the user having login credentials stored at the server, the trusted client computer device being different from the mobile device, the server including a processor; and a memory for storing computer instructions that, when executed by the processor, cause the server to: store a list of Internet Protocol (IP) addresses of authorized client devices, wherein the trusted client computer device has an IP address included in the list; request, from the trusted client computer device, a user-supplied memorable image file to be selected from a plurality of image files available to the user of the trusted client computer device including image files created by the user and image files not created by the user, and a phone number for a mobile device; receive the user-supplied memorable image file, and the phone number of the mobile device; store, in the memory, the user-supplied memorable image file, and the phone number of the mobile device; convert the user-supplied memorable image file to a first byte array by renaming a file containing the user-supplied memorable image file; associate, in the memory, the user-supplied memorable image file, and the phone number, with the login credentials of the user; request a mobile-supplied image file and login credentials from the mobile device of the user; receive the mobile-supplied image file from the mobile device of the user and converting the mobile-supplied image file to a second byte array; and authenticate the mobile device of the user in response to the second byte array matching the first byte array and in response to the login credentials of the user from the mobile device of the user matching the user's stored login credentials.

A computer program product comprising a non-transitory computer readable medium bearing computer program code which, when programmed into a server having a memory causes the server to: receive, from a trusted client computer device, a request to authenticate a mobile device of a user, the mobile device bearing a mobile app, the user having login credentials stored at the server, the trusted client computer device being different from the mobile device; request, from the trusted client computer device, a user-supplied memorable image file to be selected from a plurality of image files available to the user of the trusted client computer device including image files created by the user and image files not created by the user; receive the user-supplied memorable image file; store, in the memory, the user-supplied memorable image file, and the phone number of the mobile device; convert the user-supplied memorable image file to a first byte array by renaming a file containing the user-supplied memorable image file; associate, in the memory, the user-supplied memorable image file, and the phone number, with the login credentials of the user; request a mobile-supplied image file and login credentials from the mobile device of the user; receive the mobile-supplied image file from the mobile device of the user and convert the mobile-supplied image file to a second byte array; and authenticate the mobile device of the user in response to the second byte array matching the first byte array and in response to the login credentials of the user from the mobile device of the user matching the user's stored login credentials.

Other embodiments provide a method comprising: receiving, at a server, from a trusted client computer device, a request to authenticate a mobile device of a user, the mobile device bearing a mobile app, the user having login credentials stored at the server, the trusted client computer device being different from the mobile device; requesting, by the server, from the trusted client computer device, a user-supplied memorable image file to be selected from a plurality of image files available to the user of the trusted client computer device including image files created by the user and image files not created by the user; receiving, by the server, the user-supplied memorable image file; storing, by the server, in a memory, the user-supplied memorable image file; converting, by the server, the user-supplied memorable image file to a first byte array; associating, by the server, in the memory, the user-supplied memorable image file with the login credentials of the user; requesting, by the server, a mobile-supplied image file and login credentials from the mobile device of the user; receiving, by the server, the mobile-supplied image file from the mobile device of the user and converting the mobile-supplied image file to a second byte array; and authenticating, by the server, the mobile device of the user in response to the second byte array matching the first byte array and in response to the login credentials of the user from the mobile device of the user matching the stored login credentials of the user.

Still other embodiments provide a server configured to receive, from a trusted client computer device, a request to authenticate a mobile device of a user, the mobile device bearing a mobile app, the user having login credentials stored at the server, the trusted client computer device being different from the mobile device, the server including a processor; and a memory for storing computer instructions that, when executed by the processor, cause the server to: request, from the trusted client computer device, a user-supplied memorable image file to be selected from a plurality of image files available to the user of the trusted client computer device including image files created by the user and image files not created by the user; receive the user-supplied memorable image file; store, in the memory, the user-supplied memorable image file; convert the user-supplied memorable image file to a first byte array by renaming a file containing the user-supplied memorable image file; associate, in the memory, the user-supplied memorable image file, with the login credentials of the user; request a mobile-supplied image file and login credentials from the mobile device of the user; receive the mobile-supplied image file from the mobile device of the user and convert the mobile-supplied image file to a second byte array; and authenticate the mobile device of the user in response to the second byte array matching the first byte array and in response to the login credentials of the user from the mobile device of the user matching the user's stored login credentials.

DETAILED DESCRIPTION OF THE ILLUSTRATED EMBODIMENTS

Multi-factor authentication typically makes use of what a user knows; what a user has; and who the user is. Every element that presents equates to a factor. So "single factor authentication" means one of these presents, "two factor authentication" means two of the above (most commonly what a user knows and what a user has), and then "three factor" authentication, which is rarely used, would require all three. Many secure platforms typically rely on two factor authentication.

In some embodiments, certain IP addresses are whitelisted in a server (in a cloud application). When a user's device is within the same firewall as the server, the user's device's IP address is detected, by the server, as being within the firewall, and only a user ID and password are required of the user. More security is required when a user is outside the firewall, in various embodiments.

Figure 1:
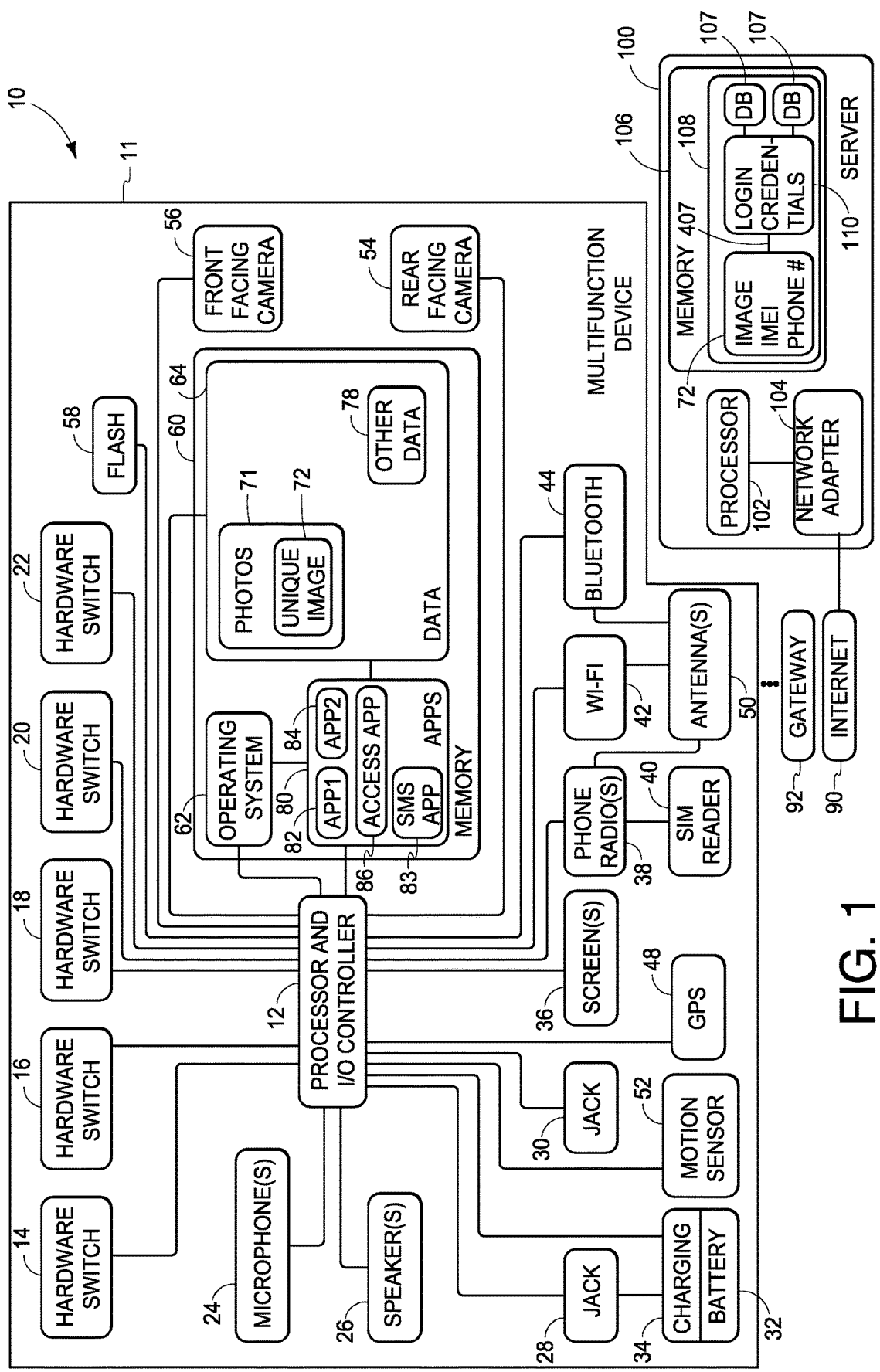
FIG. 1 is a block diagram of a system in accordance with various embodiments.

FIG. 1 shows a system 10 including a portable multifunction device 11, such as a smart phone or tablet, in accordance with various embodiments, or a laptop computer in other embodiments. The device 11 includes, for example, a processor and an Input/Output controller illustrated, for simplicity, together in the block 12.

The device 11 further includes one or more hardware buttons or switches 14, 16, 18, 20 and 22 such as a switch 14 to increase audio volume or ringer volume, a switch 16 to decrease audio volume or ringer volume, a switch 18 to switch ringer modes (e.g., from ring to vibrate), a power switch 20, and other buttons such as a home button 22 (return to main screen), for example. One or more of these hardware buttons can be replaced with soft buttons (e.g., areas on a touchscreen) in various embodiments. The buttons may be dedicated to specific functions, may control different functions in different situations, or may control functions that are assigned by a user.

The device 11, in various embodiments, includes one or more microphones 24 such as for use as the mouthpiece in a telephone call, for speakerphone use, for background noise cancellation, for recording sound, or for other sound capture applications.

The device 11 in various embodiments further includes one or more speakers 26 such as for use as the earpiece in a telephone call, for speakerphone use, for playing music, or for other audio playing applications. At least one speaker and one microphone are appropriately spaced apart for use as a telephone, in various embodiments.

The device 11 may include one or more jacks or connectors 28 and 30 such as a speaker (e.g., headphone) or speaker and microphone jack 28 and a computer interface connector 30. The computer interface connector 30, in various embodiments, allows data transfer to or from a computer, such as for transferring photos, contacts, videos, books, apps or other data to or from a computer.

The device 11 in various embodiments further includes a battery 32 and charging circuitry 34.

In some embodiments, battery charging is performed via the computer interface connector 30, such as when it connects to a USB port of a computer. In some embodiments, the connector 30 can be used for battery charging without data transfer, such as when it is coupled to a power connector such as an AC transformer, via a cable. In other embodiments, the battery is charged wirelessly. In some embodiments, the connector 30 allows docking to a docking station or table radio, for charging, or data transfer, or both. In some embodiments, the speaker, microphone, charging, and data transfer functions are all performed via a single jack.

The device 11 further includes a screen 36 which, in various embodiments, is a touchscreen. The screen 36 can include soft buttons and, in the illustrated embodiment, has reconfigurable input areas that vary depending on the situation. The screen 36 also can display text or graphics or both, in black and white or color. The screen 36, in various embodiments, is capable of recognizing gestures.

The device 11, in some embodiments, further includes one or more mobile phone radio or transceivers 38 such as a CDMA, GSM, HSPA, or LTE transceiver, or any other mobile phone radio or transceiver for transferring data or making phone calls, or some combination of multiple of these. The device 11 may also include a SIM card slot and reader 40 for receiving a SIM card containing account details of a user. The device 11 may also include one or more other radios or transceivers such as a Wi-Fi transceiver 42, a Bluetooth transceiver 44, a global positioning system receiver 48, an infrared or other transceiver (not shown) or some combination of multiple of these. The device 11 may also further include one or more antennas 50 for one or more of these transceivers 38, 42, 44, and 48.

The device 11 may further include one or more motion sensors 52 (e.g., accelerometers) for determining orientation of the device 11 or sensing position or movement of the device 11. Other sensors, such as fingerprint sensors, may be included. Certain actions may occur in response to a change of position or in response to movement.

The device 11 in various embodiments further includes a rear facing camera 54 which points away from the touchscreen 36. The device 11 in some embodiments further includes a front facing camera 56 facing in at least generally the same direction as the touchscreen, such as towards the user of the touchscreen. In other embodiments, the front facing camera 56 is omitted. In some embodiments, there is another touchscreen 36 on the rear of the device 11. The device 11 may further include one or more rear or front facing flashes 58 for illuminating the subject of a photo or video.

The device 11 further incudes a memory 60 in communication with the processor 12. The memory 60 may include volatile memory, non-volatile memory, or both, and may also include memory from a memory card or stick. The memory bears an operating system 62, such as iOS (e.g., iOS 6), an Android operating system, a Windows operating system (e.g., Windows 8), a Linux operating system, a Chrome operating system, a Firefox operating system, some variation of one of these, or another operating system. The memory 60 also contains data 64 such as music (or other audio files), videos, documents, etc. as well as pictures or photos 71 and other data 78. At least some of the data 64 is used by apps 80. The apps 80 include, for example, user-downloadable programs or applications, as well as default applications that are pre-installed when the device 11 is bought. The applications comprise, for example, games, applications for reading books, for reading magazines, for reading or editing documents, for playing music, for recording audio, for playing videos, for recording videos, for playing presentations, for taking photographs, for editing photographs, for making phone calls, etc. Such applications are available in the Apple app store, the Google Android (Play) app store, and the Amazon app store. The applications 80 installed in the device 11 of various embodiments can include multiple of such applications, indicated with reference numerals 82, 83 and 84, as well as a mobile access application (app) 86, for accessing a cloud application 108 stored in a server described in more detail below. In the illustrated embodiments, app 83 is an app for sending and receiving messages, such as text messages, over a cellular network or is an app (e.g., Facebook Messenger, What's App) that includes a feature for sending messages, such as over Wi-Fi. In some embodiments, second factor authentication codes are sent to the device 11 via the app 83 or the app 83 is otherwise used for second factor authentication. At least some of the data 64 is used or created by the applications 80. Also, at least some of the data 64 is used by the operating system 62.

The device 11 communicates with the Internet 90 via a gateway device 92, such as a Wi-Fi router if Wi-Fi transceiver 42 is used or a cell tower if the phone radio 38 is used.

The system 10 further includes a server 100. The server 100 includes components typical of Internet hosting servers including, for example, one or more processors (single or multi-core) 102, one or more network adapters 104 for communications with the workstations within a firewall, workstations outside the firewall, and smartphones or multifunction devices 11 over the Internet 90. The server 100 further has memory 106, which includes RAM, ROM, and hard drives or solid state memory, in communication with the processor 102. In some embodiments, the memory 106 defines databases 107 such as the client record, intake record, screening rule, question list, case management, and other databases described in U.S. Pat. No. 15,434,564 to Sanchez et al., filed Feb. 16, 2017 and incorporated herein by reference, and stores programs or applications, such as the application 108 shown in FIG. 1. In some embodiments, the application 108 is the cloud application described below. In some embodiments, the cloud application 108 is, includes, or is similar to, one of the applications described in U.S. Pat. No. 15,434,564. However, the cloud application 108 could be any application for which secure user authentication is desired. Other hardware arrangements are possible.

In various embodiments, prior to use of the mobile app 86, a user provides an image (e.g., .jpg, .tiff, .pdf) 72 to the cloud application 108 in the server 100, such as after having logged in to the server 100 and while using a trusted client device 402 (see FIG. 4) such as one that is inside the firewall or that has been authenticated to the server 100 using a U2F protocol, that is coupled to the server 100 via a VPN, that has used a two factor authentication, or some combination of these things, or that is otherwise trusted. The image is one that is in possession of the user, such as a photo taken by the user (e.g., using the camera 54 or 56 of device 11) and that resides on the trusted client device. The image does not need to be a picture of the user but could be. The image can be any memorable image selected by the user. In the illustrated embodiments, the user is instructed to use a unique image that only the user possesses.

The image 72 is then associated, by the server 100, with the credentials 110 that also are stored in the server for the user, such as user name, password, second factor authentication (e.g., SMS or UTF key), etc.

In some embodiments, the cloud application 108 assigns the user a PIN (personal identification number) for use in activating the mobile app 86 for use with the cloud application 108. The user downloads the mobile app 86 to the multifunction device 11 either before or after the PIN is assigned. At least the first time the user uses the mobile application, the user must supply the activation PIN. In some embodiments, in addition to the activation PIN, the user must supply, login credentials 110 (including user id and password), and the unique user-provided image 72 that was previously supplied to the server 100 the first time the user uses the mobile app 86. In the illustrated embodiments, this information is transmitted from the mobile app 86 to the server 100 and the server 100 authorizes the app 86 and authenticates the user if the expected information is received.

In some embodiments, after the first use, the PIN is no longer required but, to access the cloud application 108 using the mobile app 86, the unique user-provided image 72 and login credentials 110 are required. After the first use, when the user wants to access the cloud application 108 using the now activated mobile app 86, the user must provide, using the device 11, the unique user-provided image 72 plus login credentials 110 (user id, password, biometric information, two factor authentication, etc.), to gain access to the cloud application (or at least to gain access to sensitive data in the cloud application) via the mobile application.

In some embodiments, the correct unique user-provided image 72 must be supplied to the server before the login credentials (user id, password, biometric information, two factor authentication, etc.) can be supplied. In other embodiments, the correct login credentials 110 (including user id and password) must be supplied before the unique user-provided image 72 can be supplied. In still other embodiments, some of the login credentials are provided before the image 72 can be supplied and other of the login credentials are provided after the image 72 is supplied. Various orders of providing login credentials and the image are contemplated.

Figure 2:
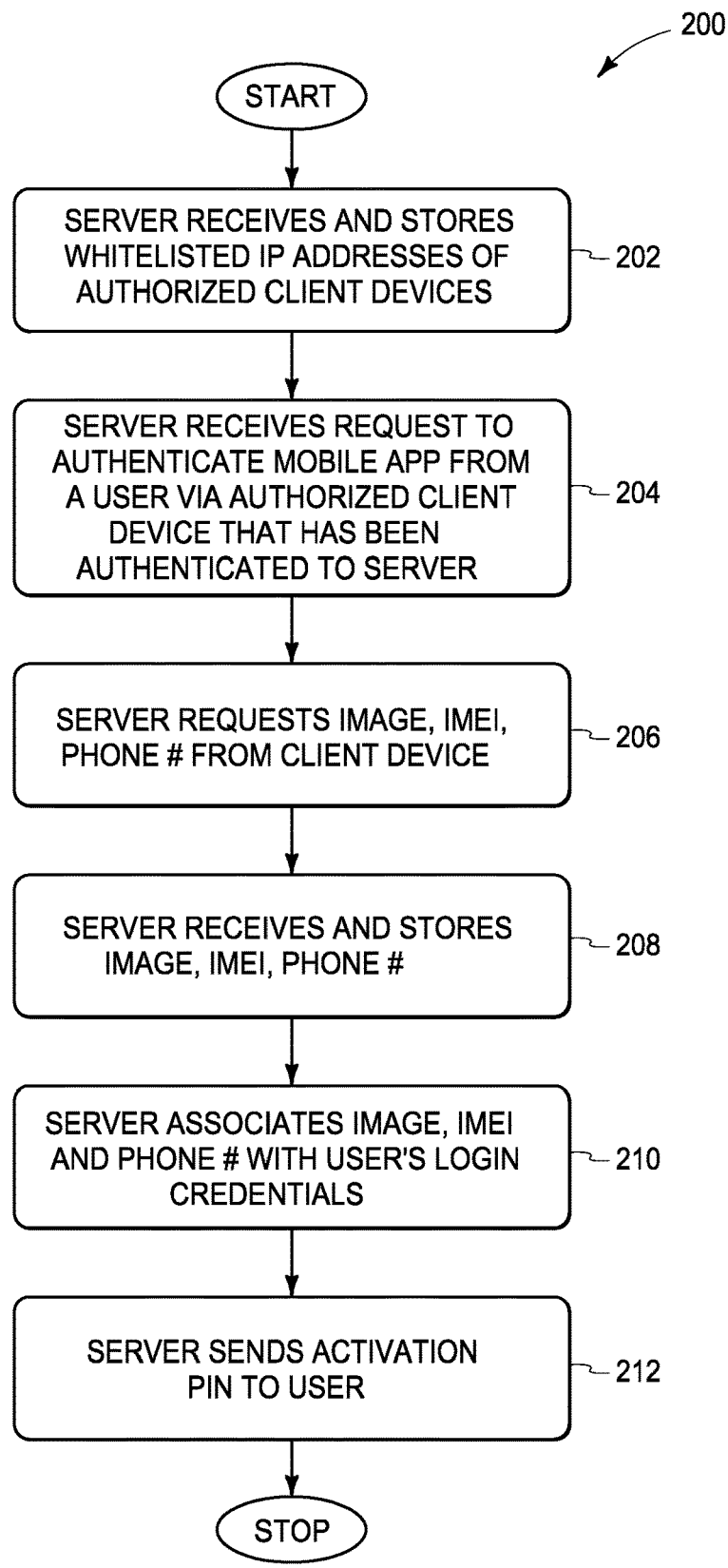
FIG. 2 is a flowchart illustrating server-side logic executed by a server of the system of FIG. 1, in some embodiments, prior to activation of a portable multifunction device of the system of FIG. 1.

FIG. 2 is a flowchart illustrating logic 200 executed by the server 100, in some embodiments, prior to allowing normal use of the mobile app 86 in interacting with the cloud application 108 in the server 100.

Figure 4:
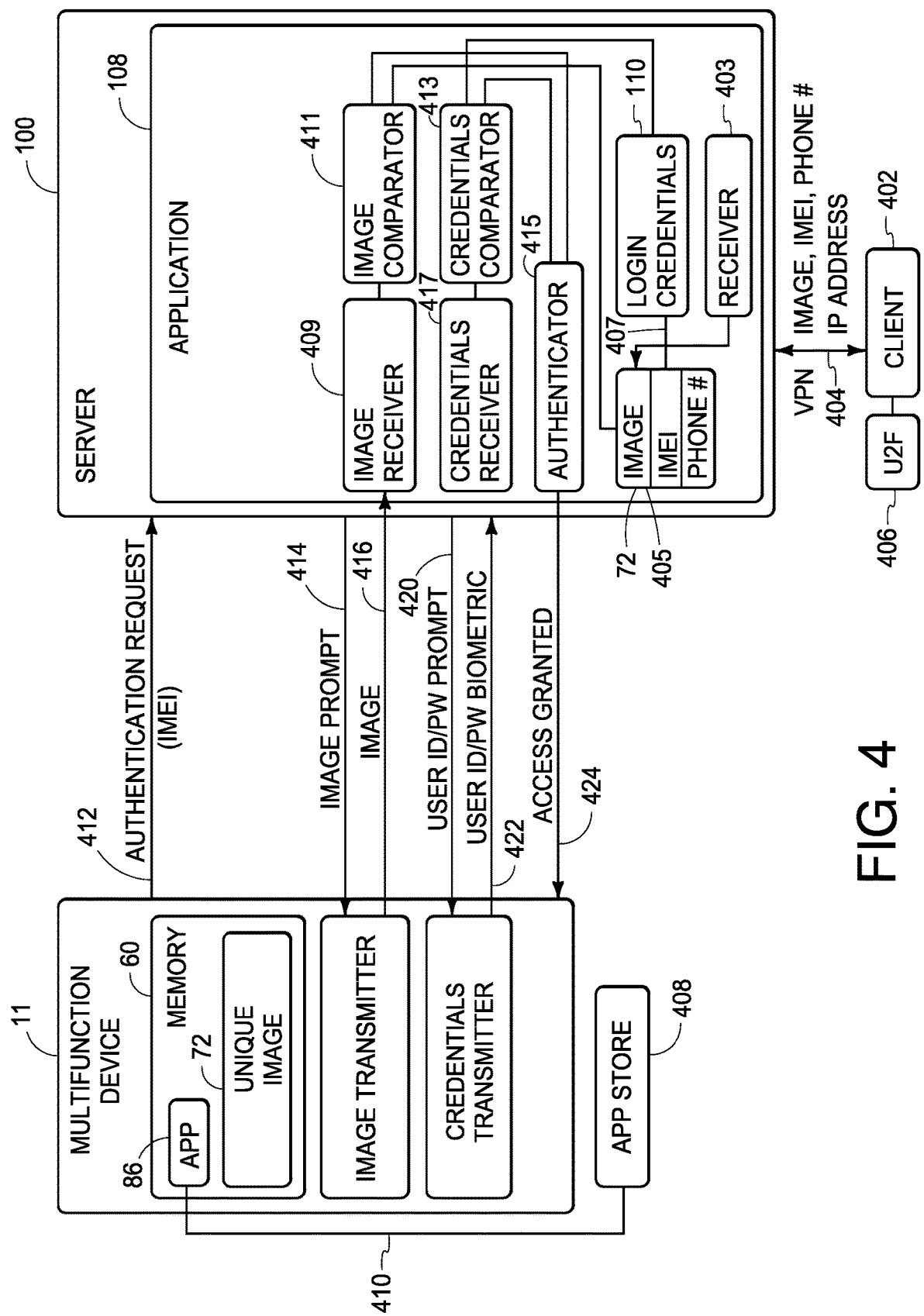
FIG. 4 is a functional block diagram illustrating combined operation of both client-side and server-side logic of the system of FIG. 1, in accordance with various embodiments.

In 202, in some embodiments, the server 100 receives and stores whitelisted IP addresses of authorized client devices 402 (see FIG. 4). These can be input directly into the server 100 or received from a client device that has been authenticated to the server 100, such as by someone with administrator credentials. These whitelisted authorized client devices are devices that are within a firewall also containing the server 100, in some embodiments. They are not the devices 11, in the illustrated embodiments. In some embodiments, for whitelisted authorized client devices, only a user ID and password is required to authenticate to the server 100 for access to the application 108.

At issue is the remote user, not within the firewall that contains the server 100, and who is using a laptop or a portable multifunction device (e.g., smart phone or tablet).

In some embodiments, for a laptop user, the server 100 requires a Virtual Private Network connection (VPN), user name, password, and U2F (USB two factor authentication security) key for access. More particularly, in some embodiments, the server 100 supports a U2F protocol and a U2F key 406 is required at the client device 402 for the client device to communicate with the server 100. In other embodiments, some combination of VPN, U2F, and two factor authentication, in addition to user name and password, is required.

In some embodiments, a different two factor authentication method is employed in place of using the U2F protocol and U2F key.

The portable multifunction devices 11 are more problematic in that mobile VPN is less robust and reliable, and some mobile devices do not have a USB port that can accept a U2F key.

In 204, the server 100 receives, from an authorized or trusted client device 402, a request to authenticate the mobile app 86. In the illustrated embodiments, the client device 402 has a whitelisted IP address (or a U2F key 406 and VPN are used) and has been authenticated to the server 100 before the server receives the request for authentication of the mobile app 86.

In 206, the server 100 requests, from the authorized client device 402, at least the image 72, but, in some embodiments, also the IMEI, phone number, or both of the portable multifunction device 11 that the user wants to use with the server 100.

In 208, the server 100 receives, from the authorized client device 402 (not from the device 11), at least the image 72, but, in some embodiments, also the IMEI, phone number, or both of the device 11. The server 100 stores this information in the memory 106. In some embodiments, the user will need to know that they must click on a certain area of a screen to upload an image. In other words, the user knows in advance based on some separate instructions where to click to upload an image, without any obvious prompt from the server.

In 210, the server 100 associates the user-supplied image 72 (as well as the IMEI, phone number, or both of the device 11, in some embodiments) with the same user's login credentials.

In 212, in some embodiments, the server sends an app activation PIN to the user of the authorized client device 402 such as by displaying it on the client device 402, by sending an email, or by otherwise communicating the PIN to the user. The PIN is to be used in activating the mobile app 86 at least the first time the mobile app 86 is used, in some embodiments. In other embodiments, the PIN is not required.

Various alternatives of server logic are contemplated for FIG. 2 in which a user-supplied image is associated with the user who supplied the image, and is used to authenticate the user to the server 100. In some embodiments, the user-supplied image is analogous to a digital fingerprint. Since it is a photo provided by the user, and preferably was taken by the user, it is unique (unlike systems that make a user choose from photos their system provides). When converted to a byte array, it is very long, and long passwords are harder to crack with brute force techniques than short ones. In some embodiments, the user must manually navigate to the image using device 11 and upload the image. In some embodiments, the server will not prompt for or describe how to upload the image. The user will be trained on the manner of uploading the image, it will not be obvious as a further element of security.

Figure 3:
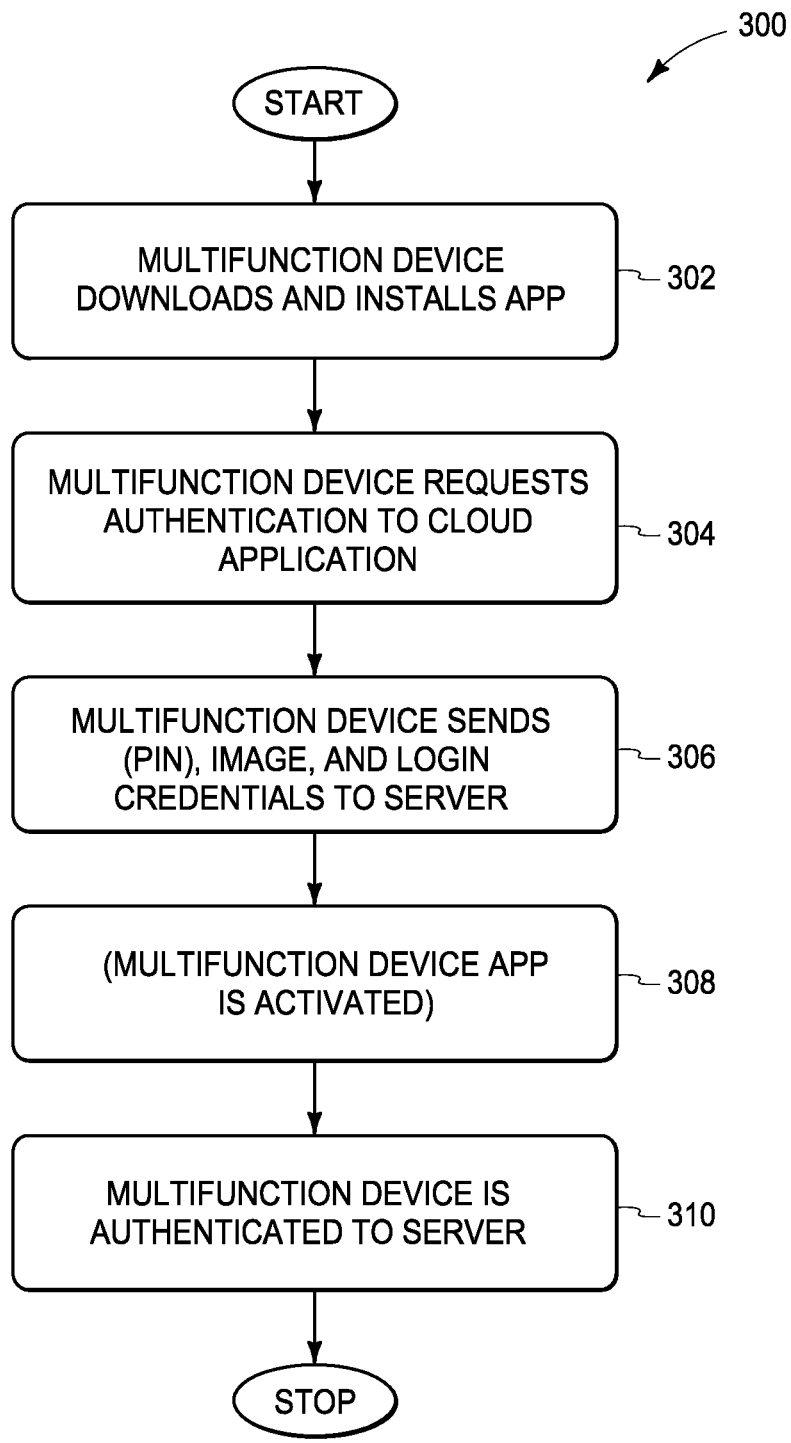
FIG. 3 is a flowchart illustrating client-side logic executed by a portable multifunction device of the system of FIG. 1, in some embodiments, for activation and authentication of the portable multifunction device.

FIG. 3 is a flowchart illustrating logic 300 executed by the portable multifunction device 11 of the system of FIG. 1, prior to normal use of the mobile app 86. The portable multifunction device 11 is shown as a smart phone in FIGS. 3 and 4, for simplicity.

In 302, the user downloads and installs the mobile app 86 into the portable multifunction device 11.

In 304, the portable multifunction device 11 requests authentication to the cloud application 108.

In 306, the portable multifunction device 11 sends the image 72 and login credentials to the server 100. The order in which login credentials and the image 72 are sent is different in different embodiments. In some embodiments, the first time that the mobile app 86 is used, it must be activated with the PIN of 212. In some embodiments, the PIN must be sent to the server 100 and match the PIN sent by the server in 212. In other embodiments, the mobile app 86 unlocks after the user enters the PIN, without needing to authenticate to the server 100.

In 308, the mobile app 86 is activated (if it is the first time the correct PIN has been entered, otherwise 308 is skipped).

In 310, the mobile app 86 of the device 11 is authenticated to the server 100.

FIG. 4 is a functional block diagram illustrating operation of the system 10 in accordance with various embodiments.

In some embodiments, in 404, a user provides their own image 72 to the cloud application 108 hosted by the server 100. In some embodiments, the user provides this image 72 to the cloud application 108 using a client device 402 that has an IP address that has been whitelisted by the server 100, after being logged in to the server 100. In some embodiments, the client 402 has an IP address that has not been whitelisted but is authenticated to the server 100 using a U2F key, a VPN, or both a U2F key and VPN in some embodiments, as well as using login credentials.

The server 100 includes a receiver 403 that receives the image 72 and stores the image in memory 405 in the server 100.

The image 72 is associated 407, by the cloud application 108 of the server 100, with whatever credentials 110 also exist for the user (e.g. user name, password, second factor authentication (SMS or UTF key, et. al.), etc.).

The cloud application 108 of the server 100 assigns the user a unique PIN (e.g. 1234), for use activating the mobile app 86.

The user downloads 410 the mobile app 86 for use in accessing the cloud application 108. For example, the user downloads the mobile app 86 from an app store 408, either before or after the PIN is assigned.

At the time of the first use of the mobile app 86, the user must supply the unique PIN for activation of the mobile app 86, the login credentials associated with the image 72, and the user must upload the image 72; e.g., from the stored photos memory area of the portable multifunction device 11. In the illustrated embodiments, the image 72 must be identical to the image associated with the login credentials, not just one that is close enough for facial recognition. For example, a resized image will not work in some embodiments. More particularly, in some embodiments, the server 100 converts the image 72 associated with the login credentials to a series of bytes, such as a base64 byte array (e.g., by renaming a .JPG image file as a .TXT file or by otherwise converting the image to bytes). The image uploaded from the device 11 is also converted to a series of bytes, and must match the series of bytes for the image 72 associated with the login credentials.

In some embodiments, after the first use, the PIN is no longer required to authenticate to the server 100. After that time, when the user wants to use mobile app 86 to access the cloud application 108, the user initiates an authentication request 412 from the portable multifunction device 11 to the server 100. At 414, the server prompts the user for at least the image 72. At 416, the user sends the image 72 from the portable multifunction device 11 to the server 100.

In various embodiments, server 100 includes an image receiver 409 that receives the image from the mobile app 86 and stores it in memory 106. In various embodiments, the server 100 includes an image comparator 411 that compares the image received from the device 11 with the image 72 in memory 106.

At 420, if the image comparator 411 determines that the image received from the device 11 matches the image 72 in memory 106, the server prompts the user, via the portable multifunction device 11, for the user's login credentials, such as login ID, password, biometric information, etc. At 422, the login credentials are sent from the portable multifunction device 11 to the server 100.

In some embodiments, the server 100 includes a credentials receiver 417 that receives the login credentials from the mobile app 86 and stores it in memory 106. The server 100 further includes a credentials comparator 413 that compares the credentials received from the device 11 with the credentials in memory 106.

The server 100 also includes an authenticator 415. If the correct PIN, image, and login credentials are provided by the user, using the portable multifunction device 11, the user is authenticated to the server 100 by the authenticator 415, and access is granted in 424.

In some alternative embodiments, some or all of the login credentials must be supplied before the image.

Thus, a method of authentication is provided for the user of a smart phone. In some embodiments, the user-provided unique photo from the portable multifunction device becomes analogous to a U2F key used with the user's laptop.

While certain functions are illustrated as being performed in certain blocks, it should be understood that various functions may be performed in other blocks or in a combination of blocks. The blocks do not necessarily correspond to software functions or routines, to integrated circuits or to circuit blocks. Multiple blocks may be defined by a single function, routine or integrated circuit or a single block may be defined by multiple functions, routines or integrated circuits.

While some embodiments disclosed herein are implemented in software, alternative embodiments comprise hardware, such as hardware including digital logic circuitry. Still other embodiments are implemented in a combination of software and digital logic circuitry.

Various embodiments comprise a computer-usable or computer-readable medium, such as a hard drive, solid state memory, flash drive, floppy disk, CD (read-only or rewritable), DVD (read-only or rewritable), tape, optical disk, floptical disk, RAM, ROM (or any other medium capable of storing program code excluding a carrier wave or propagation signal) bearing computer program code which, when executed by a computer or processor, or distributed processing system, performs various of the functions described above.

Some embodiments provide a carrier wave or propagation signal embodying such computer program code for transfer of such code over a network or from one device to another. The term "non-transitory," if used in the claims, is meant to exclude only such a carrier wave or propagation signal.

In compliance with the patent laws, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments.

I claim:

1. A method comprising:

receiving, at a server, from a trusted client computer device, a request to authenticate a mobile device of a user, the mobile device bearing a mobile app, the user having login credentials stored at the server, the trusted client computer device being different from the mobile device, and the trusted client computer being coupled to the server using a Universal Second Factor (U2F) key;

storing, at the server, a list of Internet Protocol (IP) addresses of authorized client devices, wherein the trusted client computer device has an IP address included in the list;

requesting, by the server, from the trusted client computer device, a user-supplied memorable image file to be selected from a plurality of image files available to the user of the trusted client computer device including image files created by the user and image files not created by the user;

receiving, by the server, the user-supplied memorable image file;

storing, by the server, in a memory, the user-supplied memorable image file;

converting, by the server, the user-supplied memorable image file to a first byte array by renaming a file containing the user-supplied memorable image file to a .txt file;

associating, by the server, in the memory, the user-supplied memorable image file with the login credentials of the user;

generating, by the server, a one time activation Personal Identification Number (PIN);

requesting, by the server, a mobile-supplied image file and login credentials from the mobile device of the user;

receiving, by the server, the mobile-supplied image file from the mobile device of the user and converting the mobile-supplied image file to a second byte array;

activating the mobile app in response to the user entering the PIN in the mobile app; and authenticating, by the server, the mobile device of the user in response to the second byte array matching the first byte array and in response to the login credentials of the user from the mobile device of the user matching the stored login credentials of the user, without requiring the PIN after the mobile app has been activated.

2. The method of claim 1 wherein the memorable image file is created without use of a camera.

3. The method of claim 1 and further comprising authenticating, by the server, the mobile device of the user only if the second byte array matches the first byte array identically.

4. The method of claim 1 and comprising receiving and verifying login credentials, at the server, before requesting, by the server, the mobile-supplied image file.

5. The method of claim 1 wherein the user-supplied memorable image file is an image file created by the user.

6. A server configured to receive, from a trusted client computer device, a request to authenticate a mobile device of a user, the mobile device bearing a mobile app, the user having login credentials stored at the server, the trusted client computer device being different from the mobile device, the trusted client computer being coupled to the server using a Universal Second Factor (U2F) key, the server including a processor; and a memory for storing computer instructions that, when executed by the processor, cause the server to:

store a list of Internet Protocol (IP) addresses of authorized client devices, wherein the trusted client computer device has an IP address included in the list;

request, from the trusted client computer device, a user-supplied memorable image file to be selected from a plurality of image files available to the user of the trusted client computer device including image files created by the user and image files not created by the user, and a phone number for a mobile device;

receive the user-supplied memorable image file, and the phone number of the mobile device;

store, in the memory, the user-supplied memorable image file, and the phone number of the mobile device;

convert the user-supplied memorable image file to a first byte array by renaming a file containing the user-supplied memorable image file;

associate, in the memory, the user-supplied memorable image file, and the phone number, with the login credentials of the user;

request a mobile-supplied image file and login credentials from the mobile device of the user;

receive the mobile-supplied image file from the mobile device of the user and convert the mobile-supplied image file to a second byte array; and authenticate the mobile device of the user in response to the second byte array matching the first byte array and in response to the login credentials of the user from the mobile device of the user matching the user's stored login credentials.

7. The server of claim 6 and configured to receive a memorable image file created without use of a camera.

8. The server of claim 6 and configured to authenticate the mobile device of the user only if the second byte array matches the first byte array identically.

9. The server of claim 6 and configured to receive and verify login credentials before requesting the mobile-supplied image file.

10. The server of claim 6 wherein the user-supplied memorable image file is an image file created by the user.

11. A computer program product comprising a non-transitory computer readable medium bearing computer program code which, when programmed into a server having a memory causes the server to:

receive, from a trusted client computer device, a request to authenticate a mobile device of a user, the mobile device bearing a mobile app, the user having login credentials stored at the server, the trusted client computer device being different from the mobile device, and the trusted client computer being authenticated to the server using a Universal Second Factor (U2F) key;

request, from the trusted client computer device, a user-supplied memorable image file to be selected from a plurality of image files available to the user of the trusted client computer device including image files created by the user and image files not created by the user;

receive the user-supplied memorable image file;

store, in the memory, the user-supplied memorable image file, and the phone number of the mobile device;

convert the user-supplied memorable image file to a first byte array by renaming a file containing the user-supplied memorable image file;

associate, in the memory, the user-supplied memorable image file, and the phone number, with the login credentials of the user;

request a mobile-supplied image file and login credentials from the mobile device of the user;

receive the mobile-supplied image file from the mobile device of the user and convert the mobile-supplied image file to a second byte array; and authenticate the mobile device of the user in response to the second byte array matching the first byte array and in response to the login credentials of the user from the mobile device of the user matching the user's stored login credentials.

12. The computer program product of claim 11 wherein the memorable image file is created without use of a camera.

13. The computer program product of claim 11 and further comprising code configured to cause the server to authenticate the mobile device of the user only if the second byte array matches the first byte array.

14. The computer program product of claim 11 and further comprising receiving and verifying login credentials, at the server, before requesting, by the server, the mobile-supplied image file.

15. The computer program product of claim 11 wherein the user-supplied memorable image file is an image file created by the user.

16. A method comprising:

receiving, at a server, from a trusted client computer device, a request to authenticate a mobile device of a user, the mobile device bearing a mobile app, the user having login credentials stored at the server, the trusted client computer device being different from the mobile device, and the trusted client computer being authenticated to the server using a Universal Second Factor (U2F) key;

requesting, by the server, from the trusted client computer device, a user-supplied memorable image file to be selected from a plurality of image files available to the user of the trusted client computer device including image files created by the user and image files not created by the user;

receiving, by the server, the user-supplied memorable image file;

storing, by the server, in a memory, the user-supplied memorable image file;

converting, by the server, the user-supplied memorable image file to a first byte array;

associating, by the server, in the memory, the user-supplied memorable image file with the login credentials of the user;

requesting, by the server, a mobile-supplied image file and login credentials from the mobile device of the user;

receiving, by the server, the mobile-supplied image file from the mobile device of the user and converting the mobile-supplied image file to a second byte array; and authenticating, by the server, the mobile device of the user in response to the second byte array matching the first byte array and in response to the login credentials of the user from the mobile device of the user matching the stored login credentials of the user.

17. The method of claim 16 wherein the memorable image file is created without use of a camera.

18. The method of claim 16 and further comprising authenticating, by the server, the mobile device of the user only if the second byte array matches the first byte array.

19. The method of claim 16 and comprising receiving and verifying login credentials, at the server, before requesting, by the server, the mobile-supplied image file.

20. The method of claim 16 wherein the user-supplied memorable image file is an image file created by the user.

21. A server configured to receive, from a trusted client computer device, a request to authenticate a mobile device of a user, the mobile device bearing a mobile app, the user having login credentials stored at the server, the trusted client computer device being different from the mobile device, the trusted client computer being coupled to the server using a Universal Second Factor (U2F) key, the server including a processor; and a memory for storing computer instructions that, when executed by the processor, cause the server to:
- request, from the trusted client computer device, a user-supplied memorable image file to be selected from a plurality of image files available to the user of the trusted client computer device including image files created by the user and image files not created by the user;
- receive the user-supplied memorable image file;
- store, in the memory, the user-supplied memorable image file;
- convert the user-supplied memorable image file to a first byte array by renaming a file containing the user-supplied memorable image file;
- associate, in the memory, the user-supplied memorable image file, with the login credentials of the user;
- request a mobile-supplied image file and login credentials from the mobile device of the user;
- receive the mobile-supplied image file from the mobile device of the user and convert the mobile-supplied image file to a second byte array; and
- authenticate the mobile device of the user in response to the second byte array matching the first byte array and in response to the login credentials of the user from the mobile device of the user matching the user's stored login credentials.

22. The server of claim 21 and configured to receive a memorable image file created without use of a camera.

23. The server of claim 21 and configured to authenticate the mobile device of the user only if the second byte array matches the first byte array identically.

24. The server of claim 21 and configured to receive and verify login credentials before requesting the mobile-supplied image file.

25. The server of claim 21 wherein the user-supplied memorable image file is an image file created by the user.

* * * * *